Figure 1:
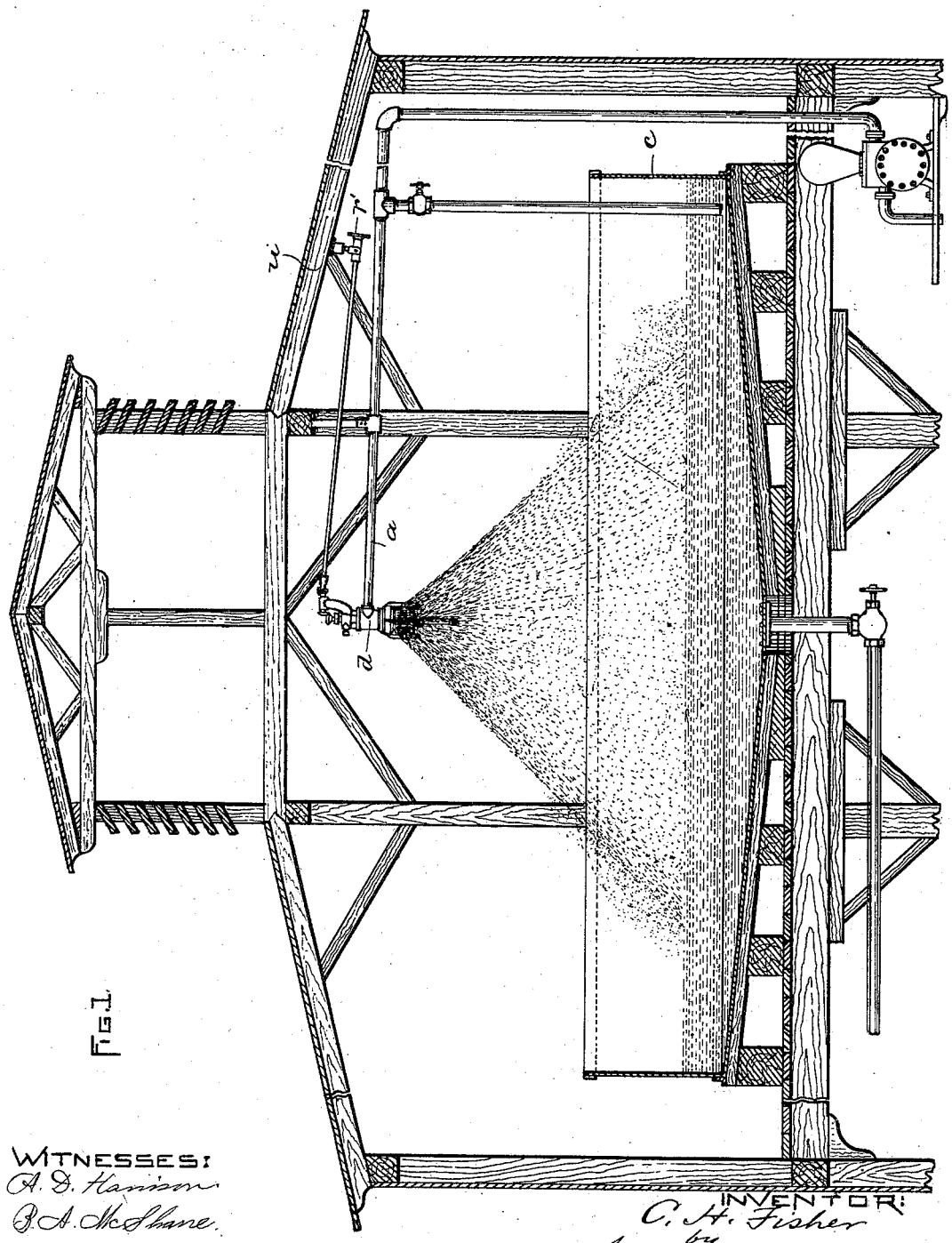

(No Model)

C. H. FISHER.
ATOMIZER.

No. 470,375.  Patented Mar. 8, 1892.

WITNESSES:
A. D. Harrison
B. A. McShane

INVENTOR:
C. H. Fisher
by Knight Brothers & Crossley
attys

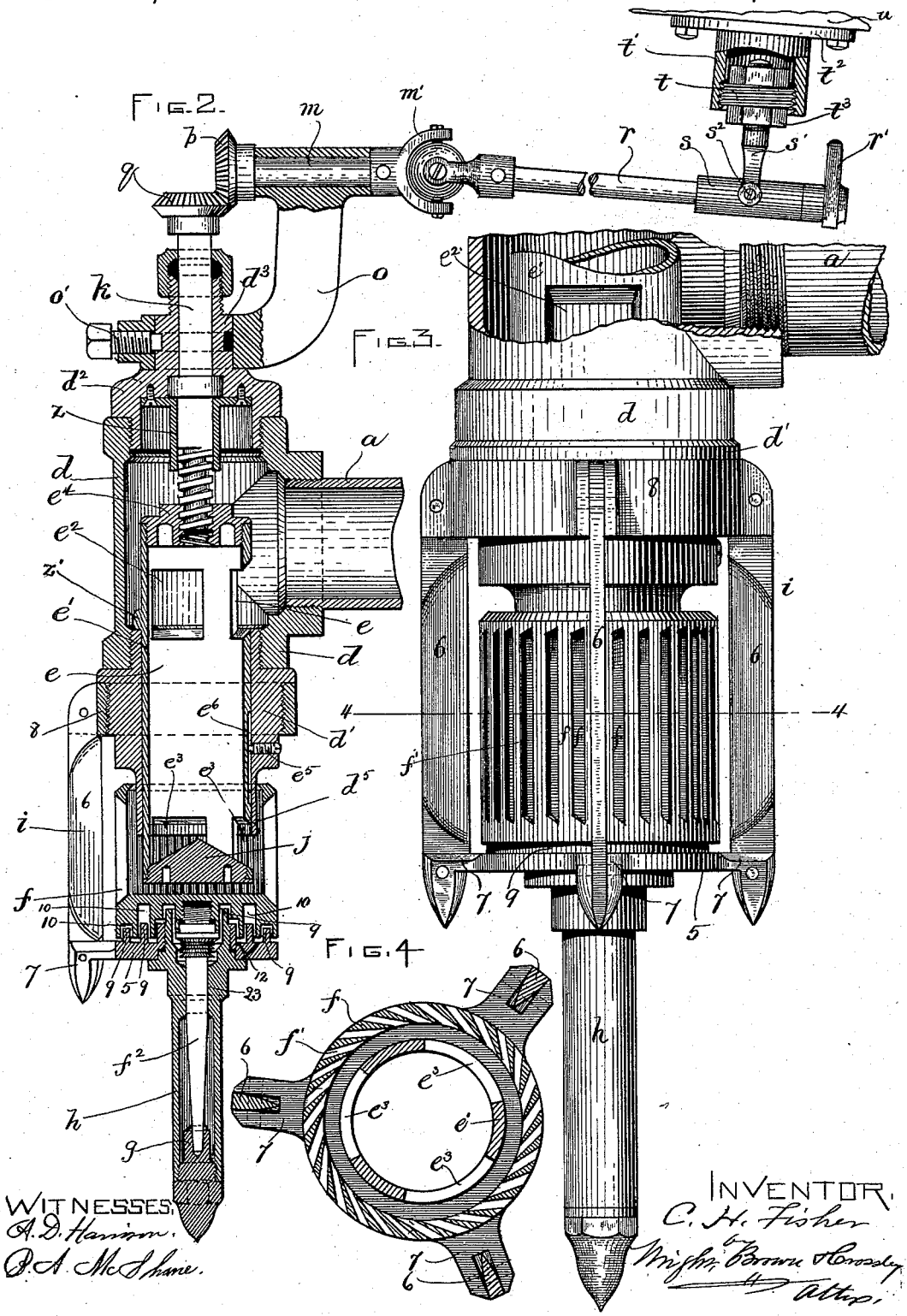

UNITED STATES PATENT OFFICE.

CHARLES HENRY FISHER, OF CANTON, MASSACHUSETTS, ASSIGNOR TO THE AMERICAN ATOMIZING AERATOR COMPANY, OF PORTLAND, MAINE.

ATOMIZER.

SPECIFICATION forming part of Letters Patent No. 470,375, dated March 8, 1892.

Application filed June 26, 1891. Serial No. 397,617. (No model.)

*To all whom it may concern:*

Be it known that I, CHARLES HENRY FISHER, of Canton, in the county of Norfolk and State of Massachusetts, have invented certain new and useful Improvements in Atomizers, of which the following is a specification.

This invention has for its object to provide a simple and effective apparatus for breaking up a stream of liquid of any desired size and volume into fine particles or drops and distributing the same widely, so as to subject them to the air, and thereby aerate and cool the liquid.

The invention consists in the improvements which I will now proceed to describe and claim.

In the accompanying drawings, forming a part of this specification, Figure 1 represents a side elevation of an atomizer embodying my improvements and a sectional view of a structure and a vat or tank therein arranged to receive the atomized liquid. Fig. 2 represents a vertical section of the atomizer. Fig. 3 represents a side elevation of a portion of the atomizer, and Fig. 4 represents a section on line 4 4 of Fig. 3.

The same letters and numerals of reference indicate the same parts in all of the figures.

My invention is designed primarily for atomizing and aerating beer-worts, and it is intended for use in breweries, although the invention is not limited to this use, and may of course be used to atomize and aerate any other liquid.

In the drawings, $a$ represents a fixed conducting-pipe, through which the liquid to be atomized may be forced by any suitable means, such as a pump $b$. I prefer to use a pump which will supply a practically-uniform quantity of liquid under all adjustments of the comminuting part of the apparatus. The delivering end of the pipe $a$ is affixed to a casing $d$, through which the liquid delivered by the pipe $a$ passes, said casing being preferably vertically arranged, so that the liquid in passing through it will flow downwardly and pass out at the lower portion of the casing, which is provided with an outlet-passage $e$, extending downwardly some distance below the casing and terminating in the interior of a rotary distributer $f$. Said distributer is preferably of cylindrical form, and is provided on its periphery with tangential or nearly tangential outlets or ports $f'$, arranged as shown in Fig. 4, the tangential arrangement of the outlets causing the distributer to be rotated by the passage of the liquid through said outlets in a manner which will be readily understood.

The distributer $f$ is provided with a spindle $f^2$, projecting downwardly from its lower portion, said spindle bearing at its lower end on a step $g$, which closely fits the spindle and is secured to a tubular standard or holder $h$, the upper portion of which is affixed to the lower portion of a cage $i$, said cage being rigidly supported in any suitable way, preferably by being connected at its upper portion to a fitting forming a part of the casing $d$. The standard or holder $h$ has a bearing 23, which closely fits the upper portion of the spindle. Said bearing and the step $g$ confine the spindle, so that it cannot move laterally while rotating. Hence the liquid is distributed through a well-defined and predetermined area, and is therefore kept within the limits of the tank which receives the atomized liquid. It will be seen that liquid forced through the supply-pipe $a$ and passing through the casing $d$ and into the distributer $f$ will steadily and continuously pass outwardly through the outlets $f'$ and in so doing will rotate the distributer, the result being that the liquid is broken up into a series of streams by the outlets, said streams being subdivided into fine drops both by their passage through the outlets and by the rotary movement of the distributer. Within the distributer is a deflector $j$, which is at the bottom of the passage $e$ and is formed and arranged to deflect the liquid passing downwardly through said passage radially outward and prevent such excessive distribution of the liquid as would be caused by the rebounding of the liquid from a flat surface at the bottom of the passage, the flaring form of the deflector deflecting the liquid without causing it to rebound to any appreciable extent.

I prefer to provide means for regulating the velocity of the flow of the liquid through the casing and into the distributer for the purpose of varying the size of the drops or particles into which the liquid is subdivided by the described action of the distributer, an increase in the velocity of the liquid causing a corresponding increase in the velocity of rotation of the distributer and a more minute subdivision of the liquid, while a decrease in the velocity of the liquid and in the rotation of the distributer causes an increase in the size of the drops or subdivisions of the liquid. To this end I provide an adjustable valve, which is here shown as comprising a tube $e'$, the interior of which constitutes the outlet-passage $e$, said tube being fitted to slide in a socket or passage-way provided for it in a fitting $d'$, attached to the lower end of the casing $d$. The upper end of the tube $e'$ projects above the fitting $d'$ and into the interior of the casing $d$, and is provided with orifices or ports $e^2 e^2$, arranged to receive the liquid entering the casing. The deflector $j$ is affixed to the lower end of the tube $e'$, said tube having outlet orifices or ports $e^3$ above said deflector, through which ports the liquid deflected by the deflector $j$ flows outwardly into the distributer. The tube $e'$ is vertically movable, so that the outlet-ports $e^3$ in its lower portion may be caused to project more or less below a sleeve $d^5$, formed on and projecting downwardly from the fitting $d'$, said ports being thus opened or closed to any desired extent, the ports being closed by the elevation of the tube and opened by the depression of the same. The tube $e'$ is adjusted by means of a rotary shaft $k$, which is journaled in a bearing formed in a fitting $d^2$, affixed to the upper end of the casing $d$, the lower end of said shaft being screw-threaded and engaged with an internally-threaded socket in a head $e^4$, affixed to the upper end of the tube $e'$. The rotation of the shaft $k$ causes the tube $e'$ to rise or fall, as the case may be, thus increasing or decreasing the operative area of the outlet-ports $e^3$.

It will be seen that by changing the operative area of the outlet-ports I am enabled to instantly vary the velocity of the liquid delivered to the distributer, the quantity of liquid supplied being kept practically constant by the action of the pump $b$, and thus regulate the size of the drops or particles into which the liquid is subdivided, the regulation produced by varying the area of the outlet-ports being more effective than any regulation that could be produced by means of a valve located at a distance from the point of delivery of the liquid to the regulator—for example, in the pipe $a$. The outlet-ports and the valve or gate that varies the area of the same are in close proximity to the distributer, so that the liquid after passing through the outlet-ports cannot pass through any conduit which would retard its velocity before it reaches the slots in the distributer. Hence the close contiguity of the valve or gate to the distributer is important.

The regulation of the size of the drops is a matter of much importance in cooling hot worts by aeration, the liquid requiring to be more finely subdivided in hot than in cold weather. It is very desirable to regulate the rapidity of evaporation in cooling atomized worts, as under some conditions too rapid evaporation has been experimentally found to be somewhat detrimental. It will be seen that I effect this regulation of the rapidity of evaporation by the regulation of the size of the drops into which the liquid is subdivided.

I do not limit myself to the devices here shown for varying the velocity of the liquid, and may use any other suitable valve whereby the operative area of outlet-ports located within or in suitable proximity to the rotary distributer may be varied.

The tube $e'$ is prevented from rotating with the screw-threaded shaft $k$ by means of a stud or screw $e^5$, inserted in the fitting $d'$, and engaged at its inner end with a vertical groove $e^6$ in the periphery of the tube $e'$, as shown in Fig. 2.

To enable the shaft $k$ to be rotated by a person at a distance from the distributer and outside of the area through which the liquid is distributed and in which the hot vapor arises, I provide the following devices: $m$ represents a shaft journaled in a bearing in an arm $o$, which is mounted upon a boss or neck $d^3$, formed on the fitting $d^2$. Said shaft has a beveled pinion $p$, meshing with a corresponding pinion $q$ affixed to the shaft $k$. The shaft $m$ may be extended continuously outward to a point within convenient reach of the operator, so that it may be rotated and by its connection with the shaft $k$ impart rotary motion to the latter. I prefer, however, instead of extending the shaft $m$ continuously, as last described, to make said shaft comparatively short and connect with it by a gimbal-joint $m'$ a supplemental shaft $r$, which may extend outwardly to a point within reach of the operator, the object of said supplemental shaft being to enable the operating-handle $r'$, which the operator grasps to effect the rotation of the shafts $m$ and $k$ and the adjustment of the tube $e'$, to be located at any desired height and to be adapted to the construction of the building in which the apparatus is located. Said gimbal-joint connection may be of the ordinary construction and permit the shaft $r$ to stand at any desired angle with the shaft $m$ and impart rotary motion to the latter while standing at any angle to which it may be adjusted, the two shafts or sections and the gimbal-joint constituting a flexible shaft. The outer portion of the supplemental shaft $r$ is journaled in a bearing $s$, which is supported by a hanger $s'$, which is preferably bifurcated, its arms or bifurcations being pivotally connected at $s^2$ with the bearing $s$. The hanger $s'$ may be detachably connected with a fixed support by any suitable means. I have here shown the hanger as provided with a stud $s^3$ above its bifurcated portion, and said stud passes through a socket formed to receive it in an adjustable head $t$, which is supported by a socket or holder $t'$ affixed to a beam or other fixed support $u$. The head $t$ is preferably circular and provided with a screw-thread on its periphery, said thread being engaged with an internal thread formed in the holder $t'$, the latter being tubular and provided with a flange $t^2$, by which it is attached to the support $u$. The screw-thread connection between the head $t$ and the holder $t'$ enables the head to be readily applied to and removed from its holder, said head being preferably provided with a polygonal shoulder $t^3$ on its lower side to receive a wrench, whereby the head may be rotated. The stud $s^3$ on the hanger is screw-threaded at its upper portion, and is provided with a nut $s^4$ bearing on the upper side of the head $t$.

It will be seen that the holder $t'$, head $t$, and hanger $s'$ constitute a simple and convenient means for supporting the outer portion of the shaft $r$ at any desired point, the holder being adapted to be readily attached to a beam or other fixed support, while the head $t$ is adapted to be readily inserted in and removed from the holder.

The arm $o$, which supports the shaft $m$, is provided with a circular socket which receives the boss $d^3$ on the fitting $d^2$, and is adapted to turn on said boss, so that the shafts $m$ and $r$ may extend in any direction from the atomizing apparatus. The arm $o$ is secured to said boss $d^3$ by means of a screw $o'$. When said screw is loosened, the arm $o$ may be turned horizontally upon the boss $d^3$ to any desired extent. The boss $d^3$ has a peripheral groove which receives the inner end of the screw $o'$, as shown in Fig. 2.

The cage $i$ before mentioned is preferably composed of a circular bottom plate 5, vertical bars 6, secured to ears or lugs 7, projecting outwardly from said bottom plate, and an internally screw-threaded ring 8, formed on or affixed to the upper ends of the bars 6, the internal screw-thread of said ring engaging with an external thread formed on the fitting $d'$. This construction permits the cage and the step-holder $h$, attached to the bottom plate thereof, to be readily applied to and removed from the fitting $d'$, it being necessary only to rotate the cage and thus screw the ring 8 onto or off from said fitting in order to apply or remove the cage.

To protect the spindle and to prevent the access of liquid, which is likely to contain adhesive substances in solution, to the interior of the step-holder $h$, I provide the bottom plate 5 of the cage with one or more upwardly-projecting concentric flanges 9 9 and the bottom plate of the distributer with a corresponding concentric groove or grooves 10, which receive the upper portions of the said flanges, the sides of said grooves and the portions of the flanges that stand between them constituting baffle-plates which prevent the inward movement of the liquid from the exterior of the distributer to the spindle $f^2$ and its step $g$. The annular flanges 9 are preferably made of increasing height from the exterior toward the center of the plate 5, the innermost flange being preferably higher than the others as a further safeguard against the admission of liquid to the holder $h$.

An outlet 12 may be provided at the bottom of the annular groove or space between the inner flange 9 and the adjoining flange for the escape of any liquid that may find its way between said flanges, or, if desired, there may be similar outlets for all the spaces between the flanges 9.

I do not limit myself to the employment of the cage $i$, attached to the casing of the apparatus, as the means for supporting the step on which the spindle of the distributer has its bearing, as said step may be supported by any other suitable means. I prefer the cage, however, because it is the most compact and reliable means for supporting said step of which I am at present aware. I prefer to make the vertical bars 6 of the cage knife-edged at their inner edges, as shown in Fig. 4, to prevent said bars from obstructing the outward movement of the liquid.

I have shown the step-holder $h$ made in a separate piece from the bottom plate 5 of the supporting-cage and screwed into an internally-threaded socket in the latter, the inner flange 9 being formed on the upper end of the step-holder.

The spindle $f^2$ is shown as screw-threaded at its upper end and screwed into an internally-threaded socket in the bottom of the distributer. Said spindle is provided just above the portion of its periphery which is in contact with the bearing 23 in the spindle-support $h$ with a series of peripheral flanges or ridges, each of which is acute-angled in cross-section, the upper side of each flange being inclined downwardly from the body of the spindle, while the under side is substantially at right angles with the axis of the spindle. The object of said flanges is to prevent the lubricant placed in the holder $h$ from creeping upwardly upon the spindle and outwardly on the surfaces of the cage and distributer, the acute edges of said flanges causing the oil to drop back into the holder.

My invention is not limited to the details of construction hereinbefore described, and shown in the drawings, as the same may be modified in various particulars without departing from the spirit of the invention. For example, the casing $d$ may be of any other suitable form and construction that will adapt it to serve as a conduit to deliver liquid to the rotary distributer.

It is important that stops be provided to limit the movements of the tube $e'$, and particularly its upward movement, which checks the velocity of the liquid. If said tube were capable of moving upwardly far enough to entirely close the ports $e^3$, the increase of pressure resulting therefrom would be likely to damage or burst parts of the apparatus. I have therefore provided two stops $z$ and $z'$, the former arranged to limit the upward and the latter the downward movement of the tube $e'$. The stop $z$ is here shown as a sleeve affixed to the fitting $d^2$ and surrounding a portion of the shaft $k$, the length of said sleeve being such that the head $e^4$ will abut against it before the ports $e^3$ are fully closed by the upward movement of the tube. The stop $z'$ is shown as a protuberance on the periphery of the tube, said protuberance being arranged to abut against the fitting $d'$ when the tube is being depressed. The stop $z'$ is important, because it prevents the depression of the tube to such an extent as to bring its lower end into contact with the bottom of the rotating distributer.

I have found that the construction of the distributer shown in the drawings is a very satisfactory one, the body of the distributer being a hollow cylinder which is slotted lengthwise by means of a saw or other rotary cutting-tool adapted to cut parallel-sided slots through the shell of the cylinder, said slots being substantially tangential, as shown in Fig. 4. The portions of the body of the cylinder between the slots are wedge-shaped in cross-section, each being substantially knife-edged at the inner surface of the cylinder and caused by its form and arrangement to "slice off" the liquid as it passes outwardly through the slots or ports. In case the distributer were rotated by power externally applied by a belt running on a pulley on the shaft of the distributer, as I have sometimes rotated it, this slicing-off action would materially diminish the resistance offered to the rotation of the distributer by the liquid, as will be readily seen. It is important that the distributer be capable of rotating with but little resistance. The construction shown, including the step $g$ and the spindle-bearing 23, supporting the spindle affixed to the distributer, accomplishes this result in a superior manner. It will be noticed that all the passages for the liquid, including the ports $e^2$ $e^3$ and the slots or ports $f$ in the distributer, are of such size and capacity that they permit the free escape of hop-leaves and other sediment and suspended matter—such as sugar—that might otherwise be accumulated or precipitated within the apparatus to an injurious extent.

I claim—

1. A liquid-atomizing apparatus comprising in its construction a casing or conduit, a rotary distributer arranged to receive liquid from said conduit and adapted to be steadily and continuously rotated by said liquid, a spindle affixed to said distributer, and a step and spindle bearing, both closely fitting the spindle and supporting the same, so that the distribution of the liquid caused by the rotation of the distributer is confined to a predetermined circular area, as set forth.

2. A liquid-atomizing apparatus comprising in its construction a liquid-conduit, a rotary distributer arranged to receive liquid from said conduit and adapted to be rotated by said liquid, a movable valve or gate contiguous to said distributer, adapted to control the velocity of liquid delivered to the distributer, and means for adjusting and holding said valve or gate at any point within its range of movement, whereby the rapidity of rotation of the distributer and the size of the drops or subdivisions of the liquid formed by the action of the distributer may be varied, as set forth.

3. A liquid-atomizing apparatus comprising in its construction a liquid-conduit, a rotary distributer arranged to receive liquid from the conduit and adapted to be steadily and continuously rotated by said liquid, and a valve or gate contiguous to the distributer, whereby the velocity of the liquid delivered to the distributer may be varied, combined with a pump connected with the conduit and adapted to supply a uniform quantity of liquid to the distributer under all adjustments of said valve or gate, as set forth.

4. In a liquid-atomizing apparatus, a liquid conduit or casing, a rotary distributer at one end of the casing, adapted to be rotated by the liquid passing through it, and a cage detachably secured to the casing and provided with a step-holder and with a step supporting a spindle on said distributer.

5. In a liquid-atomizing apparatus, a liquid-receiving casing, a distributer arranged to receive liquid from said casing and adapted to be rotated by said liquid, and a deflector within said distributer, whereby the excessive distribution of the liquid is prevented, as set forth.

6. In a liquid-atomizing apparatus, a liquid-receiving casing, a distributer arranged to receive liquid from said casing and adapted to be rotated by said liquid, a movable valve within the distributer, whereby the velocity of liquid delivered to the distributer may be varied, and a flexible shaft engaged with said valve and extending outwardly from the apparatus, the flexibility of said shaft enabling it to conform to the construction of the building in which the apparatus is located.

7. The combination of a liquid-receiving casing, a distributer arranged to receive liquid from said casing and adapted to be rotated by said liquid, a movable valve within the distributer, whereby the velocity of the liquid delivered to the distributer may be varied, a valve-operating shaft journaled in a bearing on the casing and having a screw-thread engaged with said valve, a second shaft geared to said operating-shaft, a bearing supporting one end of said second shaft, and an arm supporting said bearing and mounted to revolve about said casing, whereby the said second shaft may be caused to extend in any desired direction, as set forth.

8. The combination, substantially as hereinbefore set forth, of a liquid-receiving casing or conduit, a distributer located at the delivering end of said conduit and adapted to be rotated by the liquid passing through it, a valve comprising a tube fitted to slide relatively to a bearing or fitting forming a part of the casing and projecting at its ends outside of said bearing, one end having liquid-receiving ports, while the other end has a bottom or deflector and delivering-ports which are located within the distributer, and means for moving said valve lengthwise to vary the operative area of its delivering-ports and the velocity of the liquid delivered by said ports to the distributer.

9. The combination of the casing or conduit, the case secured thereto and having the bottom plate provided with concentric upwardly-projecting flanges, the step-holder secured to the central portion of said plate and surrounded by said flanges, and the rotary distributer having a spindle supported by a step in said holder, said distributer having a bottom plate provided with concentric grooves engaging with said concentric flanges, as set forth.

10. The combination of the casing or conduit, a rotary distributer arranged to receive and be rotated by the liquid passing through the conduit, a valve movable within the conduit and contiguous to said distributer and adapted to vary the velocity of the liquid, means for adjusting the valve and for positively holding it at any position to which it may be adjusted, and stops to limit the movements of the valve.

11. The improved rotary distributer composed of a substantially cylindrical shell having parallel-sided substantially tangential slots cut in its periphery and extending lengthwise thereof, a bottom plate, and a spindle affixed to said plate, combined with a step and spindle bearing supporting said spindle.

In testimony whereof I have signed my name to this specification, in the presence of two subscribing witnesses, this 16th day of June, A. D. 1891.

CHARLES HENRY FISHER.

Witnesses:
HORACE BROWN,
C. F. BROWN.